US012614049B2

(12) United States Patent
Kikuchi et al.

(10) Patent No.: US 12,614,049 B2
(45) Date of Patent: *Apr. 28, 2026

(54) DISPLAY MEDIUM AND CODE READING METHOD

(71) Applicant: DENSO CORPORATION, Kariya-city (JP)

(72) Inventors: Shinichi Kikuchi, Kariya-city (JP); Tatsuya Okabe, Kariya-city (JP); Mitsuo Okumura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,532

(22) Filed: Nov. 27, 2024

(65) Prior Publication Data

US 2025/0094753 A1 Mar. 20, 2025

Related U.S. Application Data

(63) Continuation of application No. PCT/JP2023/018101, filed on May 15, 2023.

(30) Foreign Application Priority Data

May 30, 2022 (JP) ................................. 2022-087899

(51) Int. Cl.
*G06K 19/06* (2006.01)

(52) U.S. Cl.
CPC ... *G06K 19/0614* (2013.01); *G06K 19/06037* (2013.01)

(58) Field of Classification Search
CPC ......... G06K 19/0614; G06K 19/06037; G06K 19/06056; G06K 7/14; G06K 19/06
See application file for complete search history.

(56) References Cited

U.S. PATENT DOCUMENTS 11,755,867 B2 * 9/2023 Yoshida ................ H04L 9/0861
235/494
2023/0094590 A1 3/2023 Okabe

* cited by examiner

*Primary Examiner* — Sonji N Johnson
(74) *Attorney, Agent, or Firm* — Precision Patents, P.C.

(57) ABSTRACT

An information code, which is displayed on a display medium, is generated by combining a first code and a second code. The information code includes: a light color cell; a dark color cell; a semi-light color cell having a color closer to the light color cell, the semi-light color cell being identified same as the light color cell when reading the first code and being identified as the dark color cell when reading the second code; and a semi-dark color cell having a color closer to the dark color cell, the semi-dark color cell being identified same as the dark color cell when reading the first code and being identified as the light color cell when reading the second code. The second code is enlarged relative to the first code, and one cell in the second code is combined across two or more cells of the first code.

8 Claims, 13 Drawing Sheets

CQ2

PUBLIC CODE

CONFIDENTIAL CODE

ENLARGED CODE

INFORMATION CODE

FIG. 4

PUBLIC CODE

| VERSION | THE NUMBER OF CELLS | CONFIDENTIAL CODE | | | | | | | | | | | | | | | | |
|---|---|---|---|---|---|---|---|---|---|---|---|---|---|---|---|---|---|---|
| (VERSION) | (THE NUMBER OF CELLS) | 1 | 2 | 3 | 4 | 5 | 6 | 7 | 8 | 9 | 10 | 11 | 12 | 13 | 14 | 15 | ... | 40 |
| | | 21 | 25 | 29 | 33 | 37 | 41 | 45 | 49 | 53 | 57 | 61 | 65 | 69 | 73 | 77 | ... | 177 |
| 1 | 21x21 | | | | | | | | | | | | | | | | | |
| ⋮ | ⋮ | | | | | | | | | | | | | | | | | |
| 10 | 57x57 | | | | | | | | | | | | | | | | | |
| 11 | 61x61 | 2 | | | | | | | | | | | | | | | | |
| 12 | 65x65 | 2 | | | | | | | | | | | | | | | | |
| 13 | 69x69 | 2 | 2 | | | | | | | | | | | | | | | |
| 14 | 73x73 | 2 | 2 | | | | | | | | | | | | | | | |
| 15 | 77x77 | 2 | 2 | 2 | | | | | | | | | | | | | | |
| 16 | 81x81 | 3 | 2 | 2 | | | | | | | | | | | | | | |
| 17 | 85x85 | 3 | 2 | 2 | (2) | | | | | | | | | | | | | |
| 18 | 89x89 | 3 | 2 | 2 | 2 | | | | | | | | | | | | | |
| 19 | 93x93 | 3 | 3 | 2 | 2 | 2 | | | | | | | | | | | | |
| 20 | 97x97 | 3 | 3 | 2 | 2 | 2 | | | | | | | | | | | | |
| 21 | 101x101 | 4 | 3 | 2 | 2 | 2 | 2 | | | | | | | | | | | |
| 22 | 105x105 | 4 | 3 | 3 | 2 | 2 | 2 | | | | | | | | | | | |
| 23 | 109x109 | 4 | 3 | 3 | 2 | 2 | 2 | 2 | | | | | | | | | | |
| 24 | 113x113 | 4 | 3 | 3 | 2 | 2 | 2 | 2 | | | | | | | | | | |
| 25 | 117x117 | 4 | 4 | 3 | 3 | 2 | 2 | 2 | 2 | | | | | | | | | |
| 26 | 121x121 | 4 | 4 | 3 | 3 | 2 | 2 | 2 | 2 | | | | | | | | | |
| 27 | 125x125 | 5 | 4 | 3 | 3 | 2 | 2 | 2 | 2 | 2 | | | | | | | | |
| 28 | 129x129 | 5 | 4 | 3 | 3 | 3 | 2 | 2 | 2 | 2 | | | | | | | | |
| 29 | 133x133 | 5 | 4 | 4 | 3 | 3 | 2 | 2 | 2 | 2 | 2 | | | | | | | |
| 30 | 137x137 | 5 | 4 | 4 | 3 | 3 | 2 | 2 | 2 | 2 | 2 | | | | | | | |
| 31 | 141x141 | 5 | 4 | 4 | 3 | 3 | 3 | 2 | 2 | 2 | 2 | 2 | | | | | | |
| 32 | 145x145 | 6 | 5 | 4 | 3 | 3 | 3 | 2 | 2 | 2 | 2 | 2 | | | | | | |
| 33 | 149x149 | 6 | 5 | 4 | 4 | 3 | 3 | 2 | 2 | 2 | 2 | 2 | 2 | | | | | |
| 34 | 153x153 | 6 | 5 | 4 | 4 | 3 | 3 | 3 | 2 | 2 | 2 | 2 | 2 | | | | | |
| 35 | 157x157 | 6 | 5 | 4 | 4 | 3 | 3 | 3 | 2 | 2 | 2 | 2 | 2 | 2 | | | | |
| 36 | 161x161 | 6 | 5 | 4 | 4 | 3 | 3 | 3 | 2 | 2 | 2 | 2 | 2 | | | | | |
| 37 | 165x165 | 7 | 5 | 5 | 4 | 4 | 3 | 3 | 3 | 2 | 2 | 2 | 2 | 2 | 2 | | | |
| 38 | 169x169 | 7 | 6 | 5 | 4 | 4 | 3 | 3 | 3 | 2 | 2 | 2 | 2 | 2 | 2 | | | |
| 39 | 173x173 | 7 | 6 | 5 | 4 | 4 | 3 | 3 | 3 | 2 | 2 | 2 | 2 | 2 | 2 | 2 | | |
| 40 | 177x177 | 7 | 6 | 5 | 4 | 4 | 3 | 3 | 3 | 3 | 2 | 2 | 2 | 2 | 2 | 2 | | |

Ce — Ceb, Cc2, Cg2, Cc1, Cg1, Cew

| PUBLIC CODE | CONFIDENTIAL CODE | INFORMATION CODE | | | |
|---|---|---|---|---|---|
| BLACK | BLACK | BLACK | | | |
| BLACK | WHITE | RED | BLUE | GREEN | 25% GRAY |
| WHITE | BLACK | YELLOW | | | 75% GRAY |
| WHITE | WHITE | WHITE | | | |

( CODE GENERATION PROCESS )

| ACQUIRE PUBLIC CODE | S11 |

| PREPARE CONFIDENTIAL INFORMATION | S12 |

| DETERMINE VERSION AND ENLARGEMENT RATIO OF CONFIDENTIAL CODE | S13 |

| GENERATE CONFIDENTIAL CODE | S14 |

| GENERATE ENLARGED CODE | S15 |

COMBINE TWO CODES — S16

| ISSUE INFORMATION CODE | S17 |

( END )

( CODE READING PROCESS )

ACQUIRE POSITION AND POSTURE OF INFORMATION CODE ⟶ S31

PREPARE CORRECTED IMAGE ⟶ S32

SPECIFY AND CUT OUT COMBINING AREA ⟶ S33

CONVERT LIGHT COLOR CELL TO BLACK CELL AND DARK COLOR CELL TO WHITE CELL ⟶ S34

READ CONFIDENTIAL INFORMATION FROM CONFIDENTIAL CODE ⟶ S35

( END )

| PUBLIC CODE VERSION | THE NUMBER OF CELLS | CONFIDENTIAL CODE | | | | | | | | | | | | | | | | | |
|---|---|---|---|---|---|---|---|---|---|---|---|---|---|---|---|---|---|---|---|
| | | VERSION 1 | 2 | 3 | 4 | 5 | 6 | 7 | 8 | 9 | 10 | 11 | 12 | 13 | 14 | 15 | 16 | 17 | ⋯ 40 |
| | | 21 | 25 | 29 | 33 | 37 | 41 | 45 | 49 | 53 | 57 | 61 | 65 | 69 | 73 | 77 | 81 | 85 | ⋯ 177 |
| 1 | 21x21 | | | | | | | | | | | | | | | | | | |
| ⋮ | ⋮ | | | | | | | | | | | | | | | | | | |
| 7 | 45x45 | 2 | | | | | | | | | | | | | | | | | |
| 8 | 49x49 | 2 | | | | | | | | | | | | | | | | | |
| 9 | 53x53 | 2 | 2 | | | | | | | | | | | | | | | | |
| 10 | 57x57 | 2 | 2 | | | | | | | | | | | | | | | | |
| 11 | 61x61 | 2 | 2 | 2 | | | | | | | | | | | | | | | |
| 12 | 65x65 | 3 | 2 | 2 | | | | | | | | | | | | | | | |
| 13 | 69x69 | 3 | 2 | 2 | (2) | | | | | | | | | | | | | | |
| 14 | 73x73 | 3 | 2 | 2 | 2 | | | | | | | | | | | | | | |
| 15 | 77x77 | 3 | 3 | 2 | 2 | 2 | | | | | | | | | | | | | |
| 16 | 81x81 | 3 | 3 | 2 | 2 | 2 | | | | | | | | | | | | | |
| 17 | 85x85 | 4 | 3 | 2 | 2 | 2 | 2 | | | | | | | | | | | | |
| 18 | 89x89 | 4 | 3 | 3 | 2 | 2 | 2 | | | | | | | | | | | | |
| 19 | 93x93 | 4 | 3 | 3 | 2 | 2 | 2 | 2 | | | | | | | | | | | |
| 20 | 97x97 | 4 | 3 | 3 | 2 | 2 | 2 | 2 | | | | | | | | | | | |
| 21 | 101x101 | 4 | 4 | 3 | 3 | 2 | 2 | 2 | 2 | | | | | | | | | | |
| 22 | 105x105 | 5 | 4 | 3 | 3 | 2 | 2 | 2 | 2 | | | | | | | | | | |
| 23 | 109x109 | 5 | 4 | 3 | 3 | 2 | 2 | 2 | 2 | 2 | | | | | | | | | |
| 24 | 113x113 | 5 | 4 | 3 | 3 | 3 | 2 | 2 | 2 | 2 | | | | | | | | | |
| 25 | 117x117 | 5 | 4 | 4 | 3 | 3 | 2 | 2 | 2 | 2 | 2 | | | | | | | | |
| 26 | 121x121 | 5 | 4 | 4 | 3 | 3 | 2 | 2 | 2 | 2 | 2 | | | | | | | | |
| 27 | 125x125 | 5 | 5 | 4 | 3 | 3 | 3 | 2 | 2 | 2 | 2 | 2 | | | | | | | |
| 28 | 129x129 | 6 | 5 | 4 | 3 | 3 | 3 | 2 | 2 | 2 | 2 | 2 | | | | | | | |
| 29 | 133x133 | 6 | 5 | 4 | 4 | 3 | 3 | 2 | 2 | 2 | 2 | 2 | 2 | | | | | | |
| 30 | 137x137 | 6 | 5 | 4 | 4 | 3 | 3 | 3 | 2 | 2 | 2 | 2 | 2 | | | | | | |
| 31 | 141x141 | 6 | 5 | 4 | 4 | 3 | 3 | 3 | 2 | 2 | 2 | 2 | 2 | 2 | | | | | |
| 32 | 145x145 | 6 | 5 | 5 | 4 | 3 | 3 | 3 | 2 | 2 | 2 | 2 | 2 | 2 | | | | | |
| 33 | 149x149 | 7 | 5 | 5 | 4 | 4 | 3 | 3 | 3 | 2 | 2 | 2 | 2 | 2 | 2 | | | | |
| 34 | 153x153 | 7 | 6 | 5 | 4 | 4 | 3 | 3 | 3 | 2 | 2 | 2 | 2 | 2 | 2 | | | | |
| 35 | 157x157 | 7 | 6 | 5 | 4 | 4 | 3 | 3 | 3 | 2 | 2 | 2 | 2 | 2 | 2 | 2 | | | |
| 36 | 161x161 | 7 | 6 | 5 | 4 | 4 | 3 | 3 | 3 | 3 | 2 | 2 | 2 | 2 | 2 | 2 | | | |
| 37 | 165x165 | 7 | 6 | 5 | 5 | 4 | 4 | 3 | 3 | 3 | 2 | 2 | 2 | 2 | 2 | 2 | 2 | | |
| 38 | 169x169 | 8 | 6 | 5 | 5 | 4 | 4 | 3 | 3 | 3 | 2 | 2 | 2 | 2 | 2 | 2 | 2 | | |
| 39 | 173x173 | 8 | 6 | 5 | 5 | 4 | 4 | 3 | 3 | 3 | 3 | 2 | 2 | 2 | 2 | 2 | 2 | 2 | |
| 40 | 177x177 | 8 | 7 | 6 | 5 | 4 | 4 | 3 | 3 | 3 | 3 | 3 | 2 | 2 | 2 | 2 | 2 | 2 | 2 |

FIG. 13

PUBLIC CODE

| VERSION | THE NUMBER OF CELLS | CONFIDENTIAL CODE |||||||||||||||| |
|---|---|---|---|---|---|---|---|---|---|---|---|---|---|---|---|---|---|---|
| | VERSION | 1 | 2 | 3 | 4 | 5 | 6 | 7 | 8 | 9 | 10 | 11 | 12 | 13 | 14 | 15 | 16 | … 40 |
| | THE NUMBER OF CELLS | 21 | 25 | 29 | 33 | 37 | 41 | 45 | 49 | 53 | 57 | 61 | 65 | 69 | 73 | 77 | 81 | … 177 |
| 1 | 21x21 | | | | | | | | | | | | | | | | | |
| ⋮ | ⋮ | | | | | | | | | | | | | | | | | |
| 9 | 53x53 | 2 | | | | | | | | | | | | | | | | |
| 10 | 57x57 | 2 | | | | | | | | | | | | | | | | |
| 11 | 61x61 | 2 | 2 | | | | | | | | | | | | | | | |
| 12 | 65x65 | 2 | 2 | | | | | | | | | | | | | | | |
| 13 | 69x69 | 2 | 2 | 2 | | | | | | | | | | | | | | |
| 14 | 73x73 | 3 | 2 | 2 | | | | | | | | | | | | | | |
| 15 | 77x77 | 3 | 2 | 2 | (2) | | | | | | | | | | | | | |
| 16 | 81x81 | 3 | 2 | 2 | 2 | | | | | | | | | | | | | |
| 17 | 85x85 | 3 | 3 | 2 | 2 | 2 | | | | | | | | | | | | |
| 18 | 89x89 | 3 | 3 | 2 | 2 | 2 | | | | | | | | | | | | |
| 19 | 93x93 | 4 | 3 | 2 | 2 | 2 | 2 | | | | | | | | | | | |
| 20 | 97x97 | 4 | 3 | 3 | 2 | 2 | 2 | | | | | | | | | | | |
| 21 | 101x101 | 4 | 3 | 3 | 2 | 2 | 2 | 2 | | | | | | | | | | |
| 22 | 105x105 | 4 | 3 | 3 | 2 | 2 | 2 | 2 | | | | | | | | | | |
| 23 | 109x109 | 4 | 4 | 3 | 3 | 2 | 2 | 2 | 2 | | | | | | | | | |
| 24 | 113x113 | 4 | 4 | 3 | 3 | 2 | 2 | 2 | 2 | | | | | | | | | |
| 25 | 117x117 | 5 | 4 | 3 | 3 | 2 | 2 | 2 | 2 | 2 | | | | | | | | |
| 26 | 121x121 | 5 | 4 | 3 | 3 | 3 | 2 | 2 | 2 | | | | | | | | | |
| 27 | 125x125 | 5 | 4 | 4 | 3 | 3 | 2 | 2 | 2 | 2 | 2 | | | | | | | |
| 28 | 129x129 | 5 | 4 | 4 | 3 | 3 | 2 | 2 | 2 | 2 | | | | | | | | |
| 29 | 133x133 | 5 | 4 | 4 | 3 | 3 | 3 | 2 | 2 | 2 | 2 | 2 | | | | | | |
| 30 | 137x137 | 6 | 5 | 4 | 3 | 3 | 3 | 2 | 2 | 2 | 2 | | | | | | | |
| 31 | 141x141 | 6 | 5 | 4 | 4 | 3 | 3 | 2 | 2 | 2 | 2 | 2 | | | | | | |
| 32 | 145x145 | 6 | 5 | 4 | 4 | 3 | 3 | 3 | 2 | 2 | 2 | 2 | | | | | | |
| 33 | 149x149 | 6 | 5 | 4 | 4 | 3 | 3 | 3 | 2 | 2 | 2 | 2 | 2 | | | | | |
| 34 | 153x153 | 6 | 5 | 4 | 4 | 3 | 3 | 3 | 2 | 2 | 2 | 2 | 2 | | | | | |
| 35 | 157x157 | 7 | 5 | 5 | 4 | 4 | 3 | 3 | 3 | 2 | 2 | 2 | 2 | 2 | 2 | | | |
| 36 | 161x161 | 7 | 6 | 5 | 4 | 4 | 3 | 3 | 3 | 2 | 2 | 2 | 2 | 2 | | | | |
| 37 | 165x165 | 7 | 6 | 5 | 4 | 4 | 3 | 3 | 3 | 2 | 2 | 2 | 2 | 2 | 2 | | | |
| 38 | 169x169 | 7 | 6 | 5 | 4 | 4 | 3 | 3 | 3 | 3 | 2 | 2 | 2 | 2 | 2 | | | |
| 39 | 173x173 | 7 | 6 | 5 | 4 | 4 | 4 | 3 | 3 | 3 | 2 | 2 | 2 | 2 | 2 | 2 | 2 | |
| 40 | 177x177 | 8 | 6 | 5 | 5 | 4 | 4 | 3 | 3 | 3 | 2 | 2 | 2 | 2 | 2 | 2 | 2 | |

DISPLAY MEDIUM AND CODE READING METHOD

CROSS REFERENCE TO RELATED APPLICATIONS

The present application is a continuation application of International Patent Application No. PCT/JP2023/018101 filed on May 15, 2023, which designated the U.S. and claims the benefit of priority from Japanese Patent Application No. 2022-087899 filed on May 30, 2022. The entire disclosures of all of the above applications are incorporated herein by reference.

TECHNICAL FIELD

The present disclosure relates to a technique of information code that records information.

BACKGROUND

There has been known an information code which is generated by combining a basic QR code (registered trademark) with another QR code. Such an information code includes not only a black cell and a white cell but also a light gray cell and a dark gray cell. Information recorded in multiple QR codes is readable individually through respective two-dimensional arrays of the cells.

SUMMARY

The present disclosure provides an information code, which is displayed on a display medium. The information cod is generated by combining a first code and a second code. The information code includes: a light color cell; a dark color cell; a semi-light color cell having a color closer to the light color cell than to the dark color cell, the semi-light color cell being identified as same as the light color cell when reading the first code and being identified as the dark color cell when reading the second code; and a semi-dark color cell having a color closer to the dark color cell than to the light color cell, the semi-dark color cell being identified as same as the dark color cell when reading the first code and being identified as the light color cell when reading the second code. The second code is enlarged relative to the first code, and one of the multiple cells in the second code is combined across two or more of the multiple cells in the first code.

BRIEF DESCRIPTION OF DRAWINGS

Objects, features and advantages of the present disclosure will become apparent from the following detailed description made with reference to the accompanying drawings.

FIG. 4 shows details of an enlargement ratio set for the confidential code.

FIG. 8 is a flowchart showing details of code reading processing executed by a code scanner or the like.

FIG. 9 shows details of image processing for extracting the confidential code from the information code.

FIG. 11 shows details of an enlargement ratio set for a confidential code in a first modification.

FIG. 13 shows details of an enlargement ratio set for a confidential code in the second modification.

DETAILED DESCRIPTION

Figure 1:
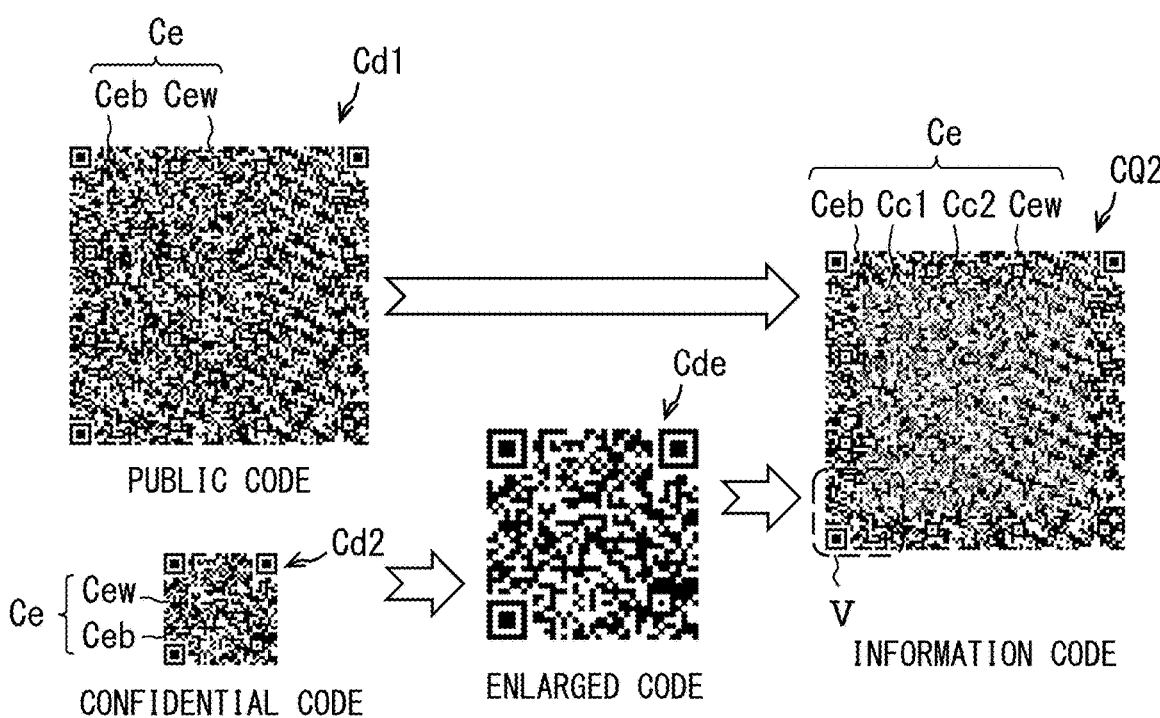
FIG. 1 shows an information code according to an embodiment of the present disclosure.

In the above-described information code, a gray cell, which has an intermediate color, is difficult to be identified as compared to black and white cells. Therefore, in a case where individual cells forming an information code are fine, or in a case where light only illuminates a part of an information code, it is particularly likely that reading of an added code may fail.

According to an aspect of the present disclosure, an information code is generated by combining a first code and a second code. in each of the first code and the second code, information is recorded by multiple cells arranged in a two-dimensional array. The information code include: a light color cell; a dark color cell; a semi-light color cell having a color closer to the light color cell than to the dark color cell, the semi-light color cell being identified as same as the light color cell in a reading of the first code and being identified as the dark color cell in a reading of the second code; and a semi-dark color cell having a color closer to the dark color cell than to the light color cell, the semi-dark color cell being identified as same as the dark color cell in the reading of the first code and being identified as the light color cell in the reading of the second code. The second code is enlarged relative to the first code, and one of the multiple cells in the second code is combined across two or more of the multiple cells in the first code.

According to another aspect of the present disclosure, a code reading method to be executed by at least one processor reads a second code from an information code. The information code is generated by combining a first code with the second code. In each of the first code and the second code, information is recorded by multiple cells arranged in a two-dimensional array. The code reading method includes: determining a semi-light color cell, which has a color closer to a light color cell than to a dark color cell, as the dark color cell; determining a semi-dark color cell, which has a color closer to the dark color cell than to the light color cell, as the light color cell; and reading the second code by identifying two or more cells in the first code as one cell.

In the above aspects, since the second code is enlarged relative to the first code, a cell size of the second code is larger than a cell size of the first code. Therefore, it is possible to reduce reading failures even for the information code including the semi-dark color cell and the semi-light color cell.

According to another aspect of the present disclosure, an information code is generated by combining a first code and a second code. In each of the first code and the second code, information is recorded by multiple cells arranged in a two-dimensional array. The information code includes: a light color cell; a dark color cell; a semi-light color cell having a color closer to the light color cell than to the dark color cell, the semi-light color cell being identified as same as the light color cell in a reading of the first code and being identified as the dark color cell in a reading of the second code; and a semi-dark color cell having a color closer to the dark color cell than to the light color cell, the semi-dark color cell being identified as same as the dark color cell in the reading of the first code and being identified as the light color cell in the reading of the second code. The second code has a smaller size than the first code and is combined at a center of the first code.

According to another aspect of the present disclosure, a code reading method to be executed by at least one processor reads a second code from an information code. The information code is generated by combining a first code with the second code. In each of the first code and the second code, information is recorded by multiple cells arranged in a two-dimensional array. The code reading method includes: specifying a formation range of the second code, which is combined at a center of the first code; determining a semi-light color cell, which has a color closer to a light color cell than to a dark color cell among the cells in the formation range, as the dark color cell; and determining a semi-dark color cell, which has a color closer to the dark color cell than to the light color cell among the cells in the formation range, as the light color cell.

In the above aspects, the second code has a smaller size than the first code and is combined at a center of the first code. Therefore, the semi-dark color cell and the semi-light color cell are not formed in the vicinity of an outer edge of the information code. In this way, by avoiding the vicinity of the outer edge, which is easily affected by light, it is possible to suppress reading failures even for the information code including the semi-dark color cell and the semi-light color cell.

An information code CQ2 according to an embodiment of the present disclosure shown in FIG. 1 is generated by combining two two-dimensional codes. Each of the two-dimensional code that serves as the basis of the information code CQ2 is, for example, a QR code (registered trademark) in which information is recorded by a two-dimensional array of multiple cells Ce. The information code CQ2 is printed on a paper medium or the like and is used in the form of a code-printed medium such as a label, a sticker, or a tag. The information code CQ2 may be displayed on a display device such as a display or electronic paper.

The information code CQ2 in the present embodiment is generated by combining a public code Cd1 and a confidential code Cd2. When the information code CQ2 is read using a normal reader such as a code reader 13 (see FIG. 2) to be described later, the information code CQ2 is recognized as the public code Cd1. In this case, information recorded in the public code Cd1 (hereinafter referred to as public information) is read. Meanwhile, the confidential code Cd2 is readable by using a special reader such as a code scanner 23 (see FIG. 2) to be described later. In this case, information recorded in the confidential code Cd2 (hereinafter referred to as confidential information) is read.

Figure 2:
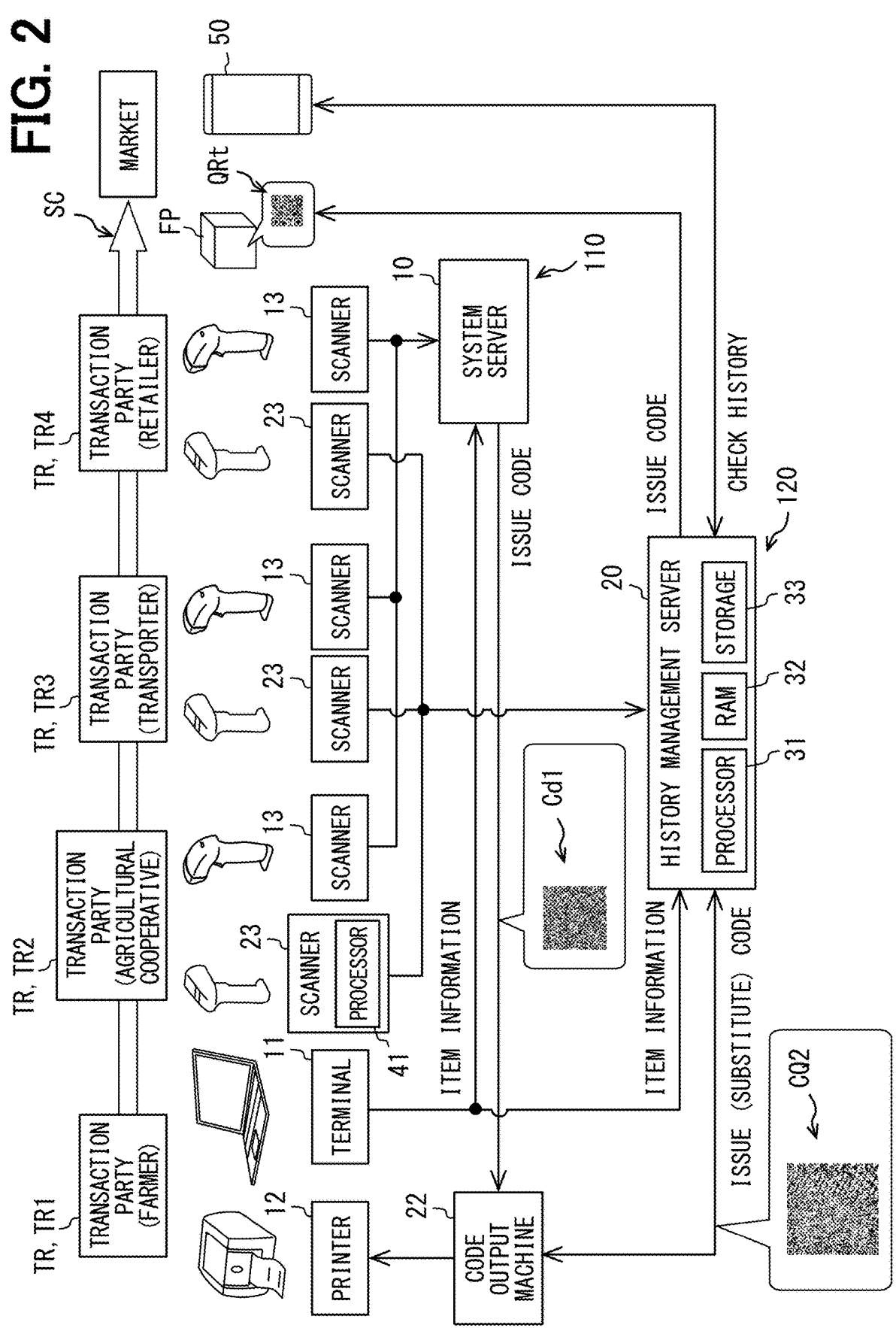
FIG. 2 shows an overall image when a traceability system is operated together with an existing distribution management system.

The information code CQ2 is used in both a distribution management system 110 and a traceability system 120 shown in FIG. 2. The distribution management system 110 and the traceability system 120 are management systems that manage a supply chain SC structured to include a large number of transaction parties TR. The supply chain SC is connection between the transaction parties for delivering an industrial product, an agricultural product, an aquatic product, and the like to an end user. As an example, in the supply chain SC for delivering an agricultural product to a consumer, the transaction parties TR includes a farmer TR1, an agricultural cooperative TR2 that is a collection facility, a transporter TR3, and a retailer TR4.

The distribution management system 110 collects, using the public code Cd1, a transaction record of a transaction item between the transaction parties TR. In other words, the public code Cd1 is a QR code used by the distribution management system 110. The distribution management system 110 includes an input terminal 11, a label printer 12, the code reader 13, and a system server 10. The input terminal 11, the label printer 12, and the code reader 13 are appropriately provided at a facility of each transaction party TR. The input terminal 11, the label printer 12, and the code reader 13 are connected, via a network, to the system server 10 provided at a data center or the like.

The input terminal 11 is, for example, a personal computer or a tablet terminal. Basic information on the transaction item (hereinafter referred to as item information) supplied to the supply chain SC is input to the input terminal 11 according to a predetermined format. For example, the item information includes an article name, a production place, a production facility, and a producer. The input terminal 11 transmits, to the system server 10, the item information on the transaction item shipped from the transaction party TR.

The label printer 12 is an output device for printing the public code Cd1 on a paper medium. The label printer 12 is capable of performing color or grayscale printing. The paper medium where the public code Cd1 is printed is attached to a package, an outer box, or the like of the transaction item to be shipped, and is distributed in a state of being attached to the transaction item.

The code reader 13 is a reading device that acquires the public information recorded in the public code Cd1 by reading the public code Cd1. The code reader 13 acquires the public information recorded in the public code Cd1 and transmits the acquired public information to the system server 10.

The system server 10 is a host node capable of communicating with the input terminal 11, the label printer 12, and the code reader 13. The system server 10 registers the item information acquired from the input terminal 11 in a database. The system server 10 prepares the public information associated with the item information and generates the public code Cd1 in which the public information is recorded. As processing for issuing the public code Cd1, the system server 10 transmits image data of the generated public code Cd1 to the label printer 12 that is a transmission source of the item information. When the issued public code Cd1 is distributed together with the transaction item and is read by the code reader 13 of another transaction party TR, the system server 10 accumulates the transaction record of the transaction item of the transaction party TR.

The traceability system 120 is used in combination with the distribution management system 110 and accumulates the transaction record in the same manner as in the distribution management system 110. Specifically, the distribution management system 110 corresponds to an old management system, and the traceability system 120 corresponds to a new management system. The traceability system 120 is operated together with the existing distribution management system 110 without substantially changing the distribution management system 110. In addition to a record generation function of accumulating the transaction record, the traceability system 120 has a record reference function of providing the accumulated transaction record in a manner that allows reference thereto. In the traceability system 120, blockchain technology is used to manage the transaction record for the purpose of preventing tampering with the transaction record.

The traceability system 120 collects the transaction record using the information code CQ2 based on the public code Cd1 issued by the system server 10. The traceability system 120 includes a code output machine 22, the code scanner 23, and a history management server 20. Further, in the traceability system 120, the input terminal 11 and the label printer 12 of the distribution management system 110 are used. The code output machine 22, the code scanner 23, and the input terminal 11 are connected, via a network, to the history management server 20 provided at a data center or the like.

The code output machine 22 is provided at the facility of the transaction party TR where the label printer 12 is provided. The code output machine 22 is provided in a manner that intercepts a communication line between the system server 10 and the label printer 12, and acquires data of the public code Cd1 transmitted from the system server 10 to the label printer 12. The code output machine 22 transmits the acquired data of the public code Cd1 to the history management server 20.

The code output machine 22 receives, from the history management server 20, data of the information code CQ2 generated based on the transmitted public code Cd1. The confidential information used in the traceability system 120 is further recorded in the information code CQ2. The code output machine 22 transmits the data of the information code CQ2 to the label printer 12 instead of the data of the public code Cd1. Due to such intervention of the code output machine 22, the label printer 12 prints the information code CQ2 on a paper medium without recognizing any modification (substitution) of the acquired code data. As a result, instead of the public code Cd1, the code-printed medium where the information code CQ2 is printed is attached to the transaction item and distributed together with the transaction item.

The code scanner 23 is a reading device that reads the confidential information that is information recorded in the information code CQ2 and added to the information code CQ2 separately from the public information. The code scanner 23 is configured to scan the same target object as the code reader 13 and thus may be physically integrated with the code reader 13. The code scanner 23 includes an imaging sensor in which CCD elements are two-dimensionally arrayed, a signal processor 41, and the like. The imaging sensor is capable of reading information recorded on a plane at a higher resolution than the code reader 13. The imaging sensor outputs a captured image in which the information code CQ2 appears (hereinafter referred to as a code captured image) to the signal processor 41.

The signal processor 41 includes a storage unit that stores a code reading program and the like, a processor that executes code reading processing (see FIG. 7) to be described later based on the code reading program, and a RAM. The signal processor 41 decodes a read signal (code captured image) of the imaging sensor according to a predetermined rule through the code reading processing and acquires the confidential information recorded in the information code CQ2. Based on the acquired confidential information, the signal processor 41 communicates with the history management server 20 in order to retain the transaction record.

A smartphone 23s (see FIG. 10), a tablet terminal, and the like having a camera function may be used as the code scanner 23. In this aspect, a dedicated application (hereinafter referred to as a code reading application) corresponding to the code reading program is provided and installed in the smartphone 23s or the like. The code reading application reads the public code Cd1 in addition to the confidential code Cd2.

The history management server 20 is a host node capable of communicating with the input terminal 11 in addition to the code output machine 22 and the code scanner 23. The history management server 20 is mainly implemented by a computer including a processor 31, a RAM 32, a storage unit 33, an input and output interface, and a bus that connects these units. The processor 31 is hardware coupled with the RAM 32 for computation processing. The processor 31 executes various types of processing related to data management by accessing the RAM 32. The storage unit 33 stores, as one management program related to data management, a code generation program for causing the processor 31 to execute a code generation method according to the present disclosure.

The history management server 20 acquires the item information transmitted from the input terminal 11 to the system server 10. Based on acquisition of the item information, the history management server 20 generates a blockchain that is associated with the transaction item and stores the item information and the transaction record. Upon acquiring a notification that the information code CQ2 is read from the code scanner 23 of each transaction party TR, the history management server 20 accumulates the transaction record of the transaction party TR, from which the notification is issued, in the blockchain associated with the transaction item.

Specifically, upon acquiring the notification from the code scanner 23, the history management server 20 generates a new block for storing the transaction record and the like of the transaction party TR from which the notification is issued. The new block includes a hash value calculated from an immediately preceding block in addition to the current transaction record. A hash function such as SHA-256 is used to generate the hash value. The hash value is data in which a predetermined number of bits (for example, 256 bits) are maintained and in which the item information and the transaction record are reflected.

The history management server 20 executes code generation processing (see FIG. 6) to be described later based on data acquisition of the public code Cd1 from the code output machine 22, and generates the information code CQ2 in which at least the hash value is recorded as the confidential information. The history management server 20 issues the generated information code CQ2 to the code output machine 22. Accordingly, the hash value reflecting the item information and the transaction record is recorded in the information code CQ2 and is available for distribution together with the transaction item.

In the traceability system 120, one information code CQ2 may be continuously used for multiple transaction parties TR, or a new information code CQ2 may be issued for each transaction party TR. In the configuration in which the new information code CQ2 is issued for each transaction party TR, a latest hash value reflecting the transaction record is generated based on occurrence of the transaction record of each transaction party TR. The history management server 20 newly generates the information code CQ2 in which the latest hash value is recorded as the confidential information, and provides data in the new information code CQ2 to the label printer 12 at the facility of the transaction party TR who performs a transaction. As a result, as an item transaction progresses, a content (hash value) in the information code CQ2 continues to be updated to a content reflecting the transaction record so far. Since the confidential information mainly includes the hash value, an amount of data in the confidential information can be maintained at a constant level even when the item transaction progresses in the supply chain SC.

The history management server 20 is capable of further issuing a trace code QRt. The trace code QRt is a two-dimensional code such as a QR code attached to a final product FP supplied by the supply chain SC. The trace code QRt enables a consumer who obtains the final product FP to check the transaction record. The trace code QRt records, as an example, a hash value calculated from a last block on the blockchain and an IP address or URL indicating an inquiry destination of the transaction record.

The consumer of the final product FP can view the transaction record of the final product FP by using a user terminal 50 such as a smartphone or a tablet terminal and using a traceability check application. Specifically, upon reading the trace code QRt attached to the final product FP, the user terminal 50 transmits a reference request for the transaction record together with the hash value to the history management server 20 that is the inquiry destination. Upon receiving the reference request, the history management server 20 extracts the item information and the transaction record associated with the hash value and generates retrieval data. The history management server 20 transmits the generated retrieval data to the user terminal 50 that issues the reference request. The consumer of the final product FP can check a history of the transaction record by loading the retrieval data received from the history management server 20 using the traceability check application.

Next, details of the information code CQ2 will be further described with reference to FIGS. 1 and 3 to 6.

As described above, the information code CQ2 is generated by combining the public code Cd1 and the confidential code Cd2 (see FIG. 1). The public code Cd1 and the confidential code Cd2 each record information by a two-dimensional array of white cells Cew and black cells Ceb. The public code Cd1 and the confidential code Cd2 are two-dimensional codes having different numbers of cells (versions). The confidential code Cd2 is a two-dimensional code having a smaller size than the public code Cd1. That is, the public code Cd1 is a two-dimensional code whose version is larger than that of the confidential code Cd2. Therefore, the number of cells in the public code Cd1 is larger than the number of cells in the confidential code Cd2. The information code CQ2 obtained by overlapping the confidential code Cd2 on the public code Cd1 is a two-dimensional code having the same number of cells (version) as the public code Cd1.

The confidential code Cd2 is enlarged by an integral multiple relative to the public code Cd1 and is then combined with the public code Cd1. Therefore, one cell Ce in the confidential code Cd2 is combined across multiple cells Ce in the public code Cd1. As an example, when the confidential code Cd2 is enlarged twice, one enlarged cell Ce is overlapped on four (2×2) cells Ce in the public code Cd1. At this time, four sides of the enlarged cell Ce are overlapped with a boundary of four outer peripheries without misalignment. The confidential code Cd2 is superimposed at a center of the public code Cd1 while avoiding a specific region SA (see FIG. 3) in the public code Cd1. As an example, a finder pattern FiP and a format information area FiA of the public code Cd1 are set as the specific region SA at least.

The finder pattern FiP is a pattern for detecting a position of the two-dimensional code (public code Cd1) and is a square formed at three locations among four corners of the two-dimensional code. The format information area FiA is a region that records format information on the two-dimensional code, specifically, information indicating an error correction level and a mask pattern. The format information area FiA is defined in an I shape or an L shape at a position desired for each finder pattern FiP.

By avoiding the specific region SA, a central region except for eight cells or nine cells adjacent to four outer edges in the public code Cd1 serves as a combining area CA where the confidential code Cd2 can be disposed. That is, the number of cells in the combining area CA is smaller than the number of cells in the public code Cd1 by seventeen cells in each of vertical and horizontal directions. The combining area CA is disposed to avoid a version information area ViA, a timing pattern TiP, and a part of an alignment pattern AlP in addition to the finder pattern FiP and the format information area FiA. The version information area ViA is a region that records information indicating the version of the two-dimensional code. The version information area ViA is defined at a position adjacent to each of two diagonally disposed finder patterns FiP.

An enlargement ratio of the confidential code Cd2 is set such that the enlarged confidential code Cd2 (hereinafter referred to as an enlarged code Cde) falls within the combining area CA. Therefore, the enlargement ratio of the confidential code Cd2 is determined based on the versions of the public code Cd1 and the confidential code Cd2 to be combined (see FIG. 4). As an example, when the version of the public code Cd1 is 17 (the number of cells is 85×85), a size of the combining area CA is 68×68. In this case, if the version of the confidential code Cd2 is 4 (the number of cells is 33×33), an enlargement ratio of two can be set (see a dashed square in FIG. 4).

The information code CQ2 includes a light color cell Cc1 (see a light gray range in FIG. 1 and FIG. 5) and a dark color cell Cc2 (see a dark gray range in FIG. 1 and FIG. 5) in addition to the white cell Cew and the black cell Ceb. The light color cell Cc1 and the dark color cell Cc2 are disposed only in the combining area CA. The information code CQ2 retains both the public information and the confidential information in a two-dimensional array of the white cell Cew, the black cell Ceb, the light color cell Cc1, and the dark color cell Cc2. Each cell Ce in the information code CQ2 is determined based on a combination of the white cell Cew and the black cell Ceb in each of the public code Cd1 and the confidential code Cd2 (see FIG. 6).

Specifically, the cell Ce at a position where both the public code Cd1 and the confidential code Cd2 are the black cell Ceb is also the black cell Ceb in the information code CQ2. Similarly, the cell Ce at a position where both the public code Cd1 and the confidential code Cd2 are the white cell Cew is also the white cell Cew in the information code CQ2.

Figure 6:
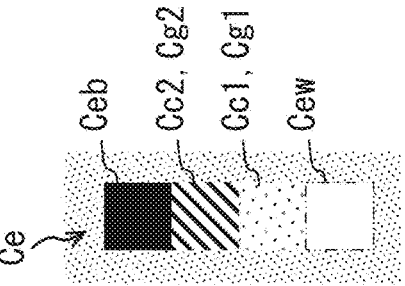
FIG. 6 shows a rule for combining a public code and the confidential code.

Meanwhile, the cell Ce at a position where the public code Cd1 is the black cell Ceb and the confidential code Cd2 is the white cell Cew is the dark color cell Cc2 (see a hatched range in FIG. 6). The cell Ce at a position where the public code Cd1 is the white cell Cew and the confidential code Cd2 is the black cell Ceb is the light color cell Cc1 (see a dotted range in FIG. 6). The dark color cell Cc2 is a cell Ce in a chromatic color whose lightness is closer to the black cell Ceb than to the white cell Cew and whose lightness is lower than that of the light color cell Cc1. For example, red, blue, or green is adopted as the color of the dark color cell Cc2. The light color cell Cc1 is a cell Ce in a chromatic color whose lightness is closer to the white cell Cew than to the black cell Ceb and whose lightness is higher than that of the dark color cell Cc2. For example, yellow or the like is adopted as the color of the light color cell Cc1.

In the information code CQ2, a dark gray cell Cg2 and a light gray cell Cg1 can be adopted instead of the dark color cell Cc2 and the light color cell Cc1. When the label printer 12 has a configuration in which a color output is not available whereas a grayscale output is available, the dark gray cell Cg2 and the light gray cell Cg1 are adopted. The dark gray cell Cg2 has an achromatic color closer to the black cell Ceb than to the white cell Cew and is a cell Ce having an intermediate color whose lightness is lower than that of the light gray cell Cg1. For example, dark gray having lightness of about 25% of that of the white cell Cew is adopted as the color of the dark gray cell Cg2. The light gray cell Cg1 has an achromatic color closer to the white cell Cew than to the black cell Ceb and is a cell Ce having an intermediate color whose lightness is higher than that of the dark gray cell Cg2. For example, light gray having lightness of about 75% of that of the white cell Cew is adopted as the color of the light gray cell Cg1.

Here, the code reader 13 (see FIG. 2) in the distribution management system 110 corresponding to the old management system detects the lightness of each cell Ce, that is, light reflectance of each cell Ce when reading the information code CQ2. Therefore, the code reader 13 identifies the light color cell Cc1 and the light gray cell Cg1 as the white cell Cew, and identifies the dark color cell Cc2 and the dark gray cell Cg2 as the black cell Ceb. As a result, the code reader 13 is capable of recognizing that the information code CQ2 is substantially the same two-dimensional code as the public code Cd1 and reading the public information.

Figure 7:
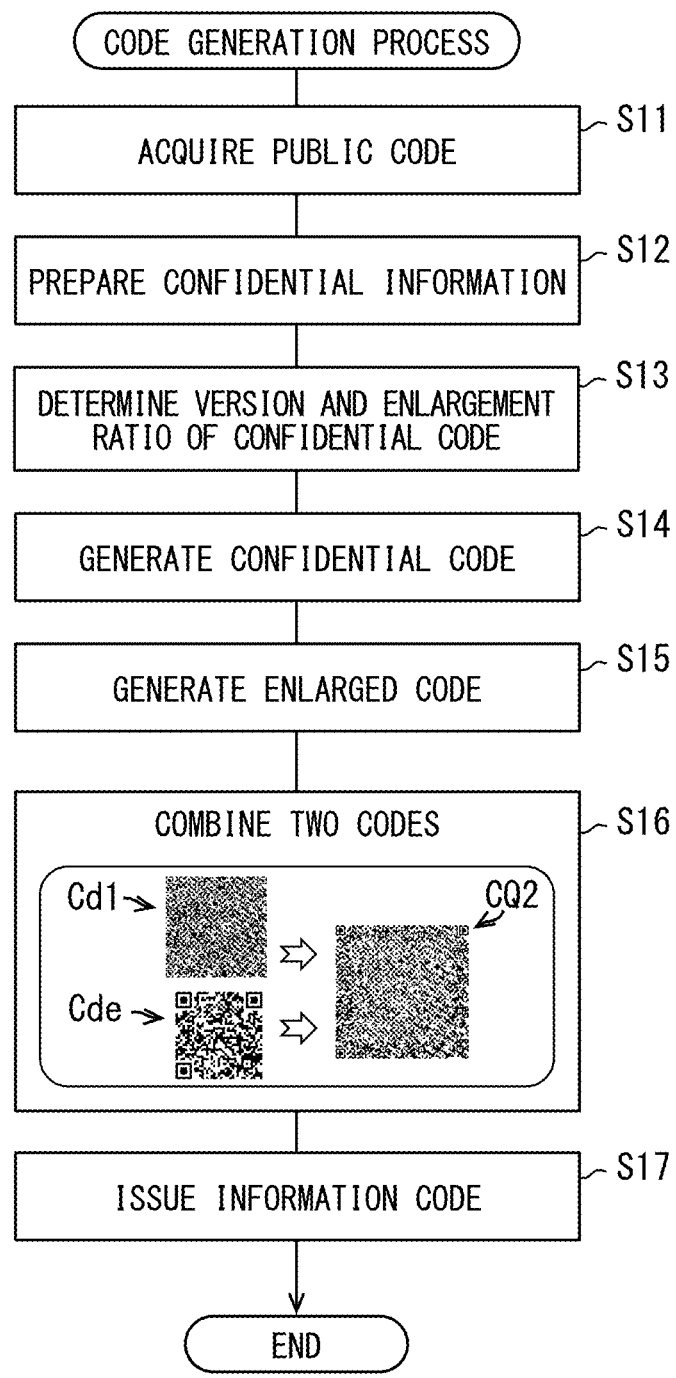
FIG. 7 is a flowchart showing details of code generation processing executed by a history management server.

Next, details of the code generation processing (code generation method) for generating the information code CQ2 described so far will be described below based on FIG. 7 with reference to FIGS. 1, 2, and 4 to 6.

In the code generation processing, first, the public code Cd1 and the confidential code Cd2 are prepared. Specifically, the history management server 20 acquires the public code Cd1 by receiving from the code output machine 22 in S11. Next, in S12, the history management server 20 acquires the hash value reflecting the item information and the transaction record, and prepares the confidential information mainly including the hash value.

In S13, the history management server 20 determines the version and the enlargement ratio of the confidential code Cd2 based on the version of the public code Cd1 acquired in S11. For example, when the version of the public code Cd1 is 17, the version of the confidential code Cd2 is 4 or less. The history management server 20 determines the version and an error correction level of the confidential code Cd2 such that an amount of data (the number of bits) in the confidential information acquired in S12 can be recorded. The signal processor 41 further determines a maximum enlargement ratio that allows the determined confidential code Cd2 to be accommodated in the combining area CA.

In S14, the history management server 20 generates the confidential code Cd2 having the version and the error correction level determined in S13. Further, in S15, the history management server 20 enlarges the confidential code Cd2 at the enlargement ratio determined in S13 to generate the enlarged code Cde.

In S16, the history management server 20 performs combination by superimposing the enlarged code Cde generated in S15 on the combining area CA of the public code Cd1 acquired in S11. As described above, in the public code Cd1, the black cell Ceb overlapping the white cell Cew in the enlarged code Cde is converted into the dark color cell Cc2 or the dark gray cell Cg2 (see FIG. 6). In the public code Cd1, the white cell Cew overlapping the black cell Ceb in the enlarged code Cde is converted into the light color cell Cc1 or the light gray cell Cg1. As a result, the information code CQ2 is generated in which the white cell Cew, the black cell Ceb, the light color cell Cc1, and the dark color cell Cc2 are two-dimensionally arrayed. The information code CQ2 generated in this manner is issued to the transaction party TR in S17.

Figure 3:
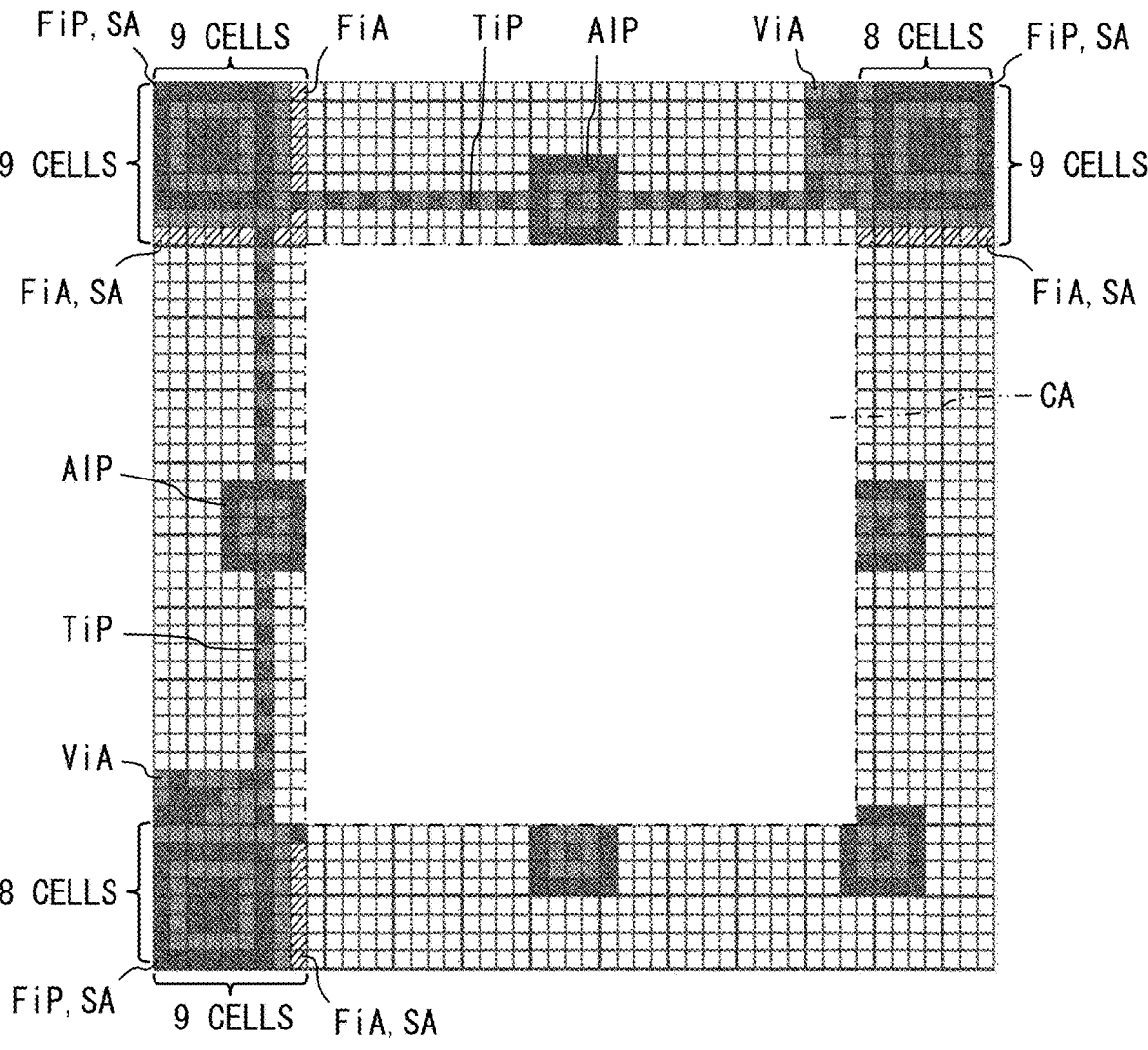
FIG. 3 shows details of a combining area where a confidential code is combined.
Figure 5:
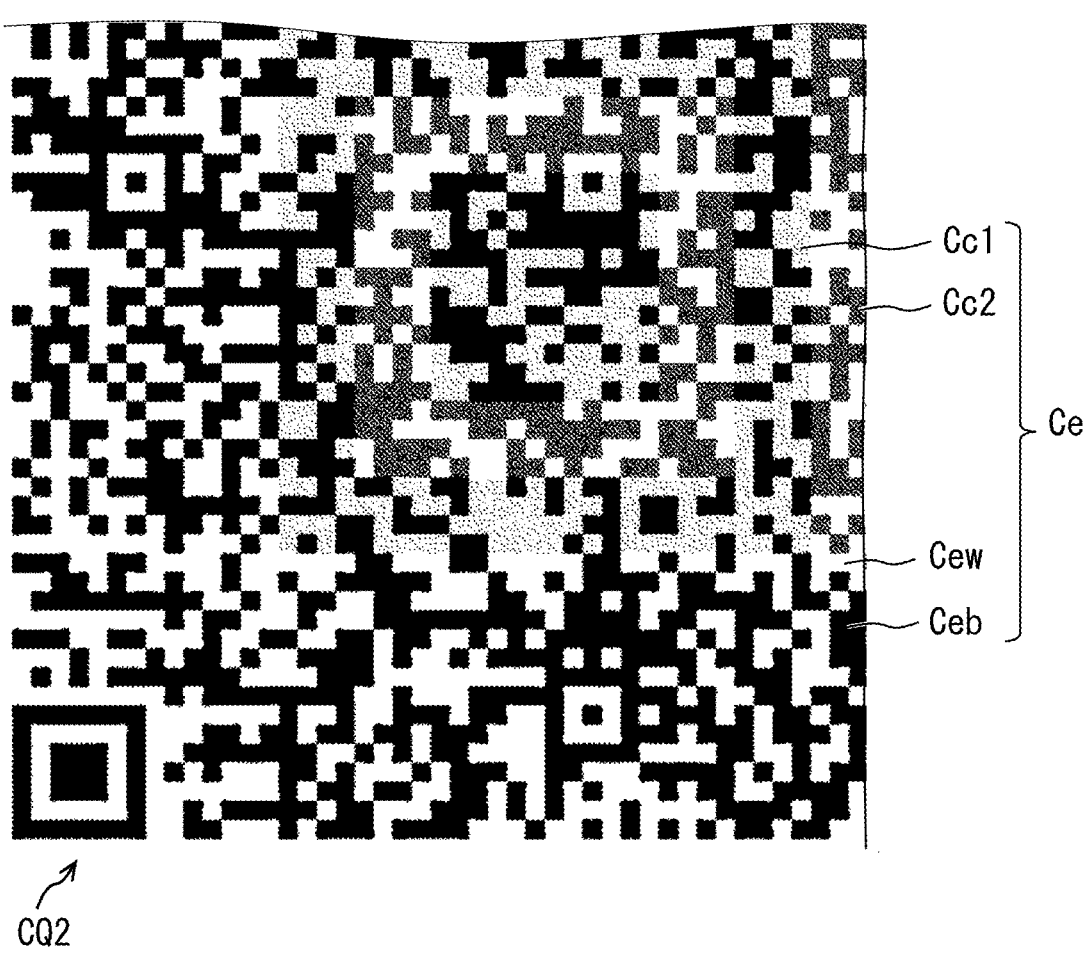
FIG. 5 is an enlarged view in which a region V in the information code in FIG. 1 is enlarged.
Figure 8:
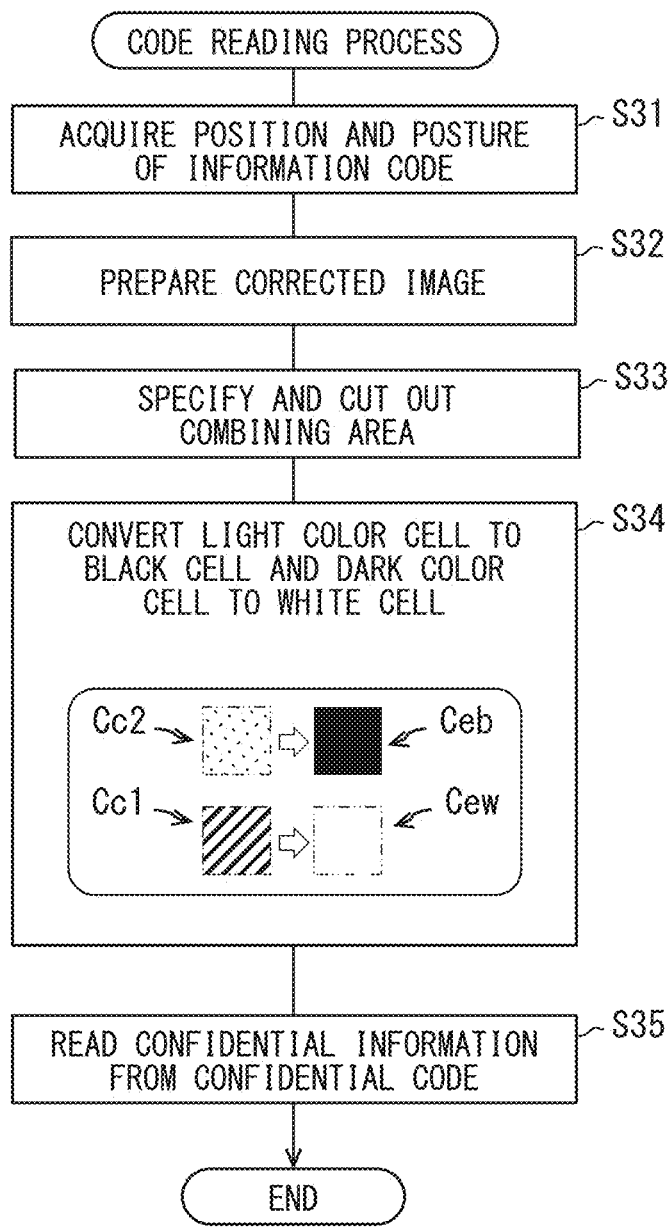

Next, details of the code reading processing (code reading method) for reading the confidential code Cd2 from the information code CQ2 will be described based on FIGS. 8 and 9 with reference to FIGS. 1 to 3.

In S31 in the code reading processing, the signal processor 41 acquires a position and a posture of the information code CQ2 appearing in the code captured image based on detection of the finder pattern FiP. In S32, the signal processor 41 applies preprocessing such as trapezoidal correction and color correction to a range where the information code CQ2 appears based on information on the position and the posture of the information code CQ2, and prepares a processed image (hereinafter, referred to as a corrected image Pc0) suitable for code reading. The corrected image Pc0 is an image corrected to a shape obtained by imaging the information code CQ2 from the front. In addition, in the corrected image Pc0, a gradation value of the entire image is adjusted such that gradation values of the white cell Cew and the black cell Ceb in the information code CQ2 are substantially the same.

In S33, the signal processor 41 specifies the combining area CA where the confidential code Cd2 is combined in the information code CQ2 appearing in the corrected image Pc0, and cuts out the specified combining area CA from the information code CQ2. In other words, in S33, specification and cutout are performed in a central range where the light color cell Cc1 and the dark color cell Cc2 are disposed.

Figure 9:
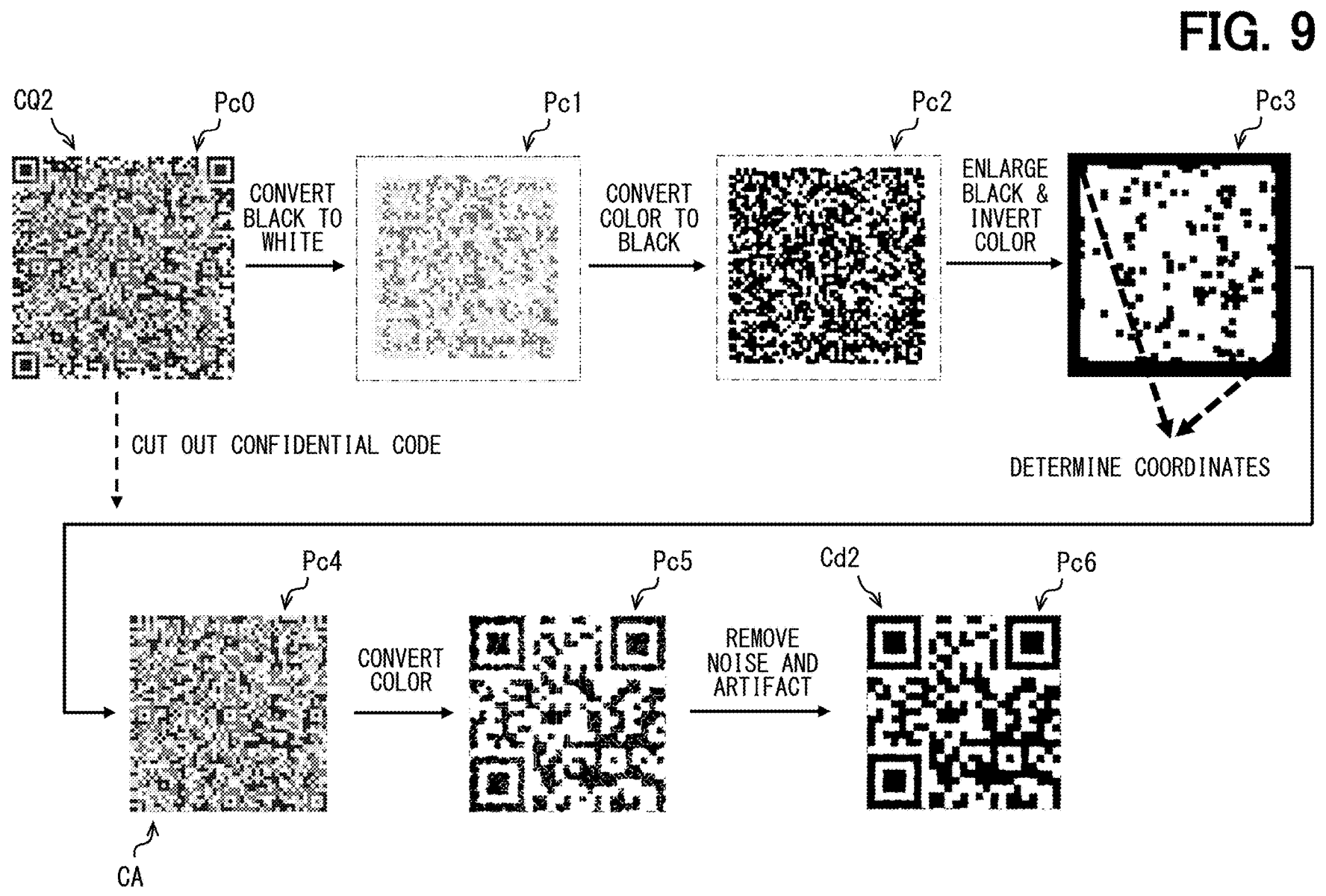

The signal processor 41 first generates a first converted image Pc1 obtained by converting the black cell Ceb in the information code CQ2 into the same white color as the white cell Cew in order to specify the combining area CA (see FIG. 9). Next, the signal processor 41 generates a second converted image Pc2 by converting the light color cell Cc1 and the dark color cell Cc2 in the first converted image Pc1 into the same black color as the black cell Ceb. Further, the signal processor 41 generates an inverted image Pc3 obtained by inverting lightness and darkness (white and black) of colors in the second converted image Pc2. The signal processor 41 specifies the combining area CA based on a range of a light color (white) in the inverted image Pc3. Specifically, the signal processor 41 determines coordinates of a pair of corners diagonally located in the white range in the inverted image Pc3 by labeling the inverted image Pc3. The signal processor 41 acquires the pair of coordinates as coordinates indicating a formation range of the combining area CA. The signal processor 41 cuts out a cutout image Pc4 including the confidential code Cd2 from the combining area CA in the corrected image Pc0 based on the acquired coordinates.

In S34, the signal processor 41 extracts the confidential code Cd2 from the cutout image Pc4 by applying processing of performing color conversion. Specifically, the signal processor 41 generates an extracted image Pc5 in which the confidential code Cd2 is extracted by monochrome conversion in which the light color cell Cc1 is treated as the black cell Ceb and the dark color cell Cc2 is treated as the white cell Cew among the cells Ce in the combining area CA. Further, the signal processor 41 removes noise and artifacts in the extracted image Pc5 by performing dilation and erosion on a black range in the extracted image Pc5. By applying such correction processing to the extracted image Pc5, the signal processor 41 generates a restored image Pc6 in which the confidential code Cd2 is restored.

In S35, the signal processor 41 reads the restored image Pc6 as the confidential code Cd2 and reads the confidential information, thereby ending the code reading processing. At this time, in the restored image Pc6, one cell Ce in the confidential code Cd2 has a size corresponding to multiple cells Ce in the public code Cd1. Therefore, the signal processor 41 reads the confidential code Cd2 by treating the multiple cells Ce in the public code Cd1 as one cell Ce. Therefore, reading of the confidential information from the restored image Pc6 is facilitated.

The code reading processing may be executed by the history management server 20. In this aspect, the code captured image or the corrected image Pc0 is transmitted from the code scanner 23 to the history management server 20. The history management server 20 executes processing of reading the confidential code Cd2 from the code captured image or the corrected image Pc0 acquired by reception. When the light gray cell Cg1 and the dark gray cell Cg2 are adopted instead of the light color cell Cc1 and the dark color cell Cc2, it is still possible to restore the confidential code Cd2 by the above processing.

In the present embodiment described so far, since the confidential code Cd2 is enlarged relative to the public code Cd1, a size of the cell Ce in the confidential code Cd2 is larger than a size of the cell Ce in the public code Cd1. Therefore, it is possible to reduce code reading failures even in the case of the information code CQ2 including the dark color cell Cc2 and the light color cell Cc1.

Specifically, it is more difficult to read the two-dimensional code as the size of one cell Ce decreases. In particular, as the information code CQ2 including the light color cell Cc1 and the dark color cell Cc2 becomes finer, recognition performance further deteriorates. To solve this problem, in the present embodiment, the confidential code Cd2 whose version is smaller than that of the public code Cd1 is enlarged relative to the public code Cd1 and then combined with the public code Cd1. In this way, since the size of one cell Ce can be ensured by enlarging the confidential code Cd2 at the time of combining, it is possible to limit recognizability deterioration even when the light color cell Cc1 and the dark color cell Cc2 are contained.

In addition, in the present embodiment, the confidential information recorded in the confidential code Cd2 is a content mainly including the hash value. Therefore, an amount of information required to be recorded as the confidential information is limited, and thus it is possible to reduce the version of the confidential code Cd2. As described above, the method of improving the recognizability by enlarging the confidential code Cd2 is suitable for the traceability system 120 that records the hash value as the confidential information.

In the present embodiment, the confidential code Cd2 is enlarged by an integral multiple relative to the public code Cd1 and combined with the public code Cd1. Therefore, a situation where multiple cells Ce in the confidential code Cd2 are combined with one cell Ce in the public code Cd1 is avoided. According to the above, since the recognizability of the public code Cd1 can be ensured, it is possible to reduce failures in reading the public code Cd1.

Further, in the present embodiment, the confidential code Cd2 has a smaller size than the public code Cd1 and is combined at the center of the public code Cd1. Therefore, the dark color cell Cc2 and the light color cell Cc1 are not formed in the vicinity of an outer edge of the information code CQ2. By avoiding the vicinity of the outer edge that is easily affected by light in this manner, it is possible to reduce reading failures even in the case of the information code CQ2 including the dark color cell Cc2 and the light color cell Cc1.

Figure 10:
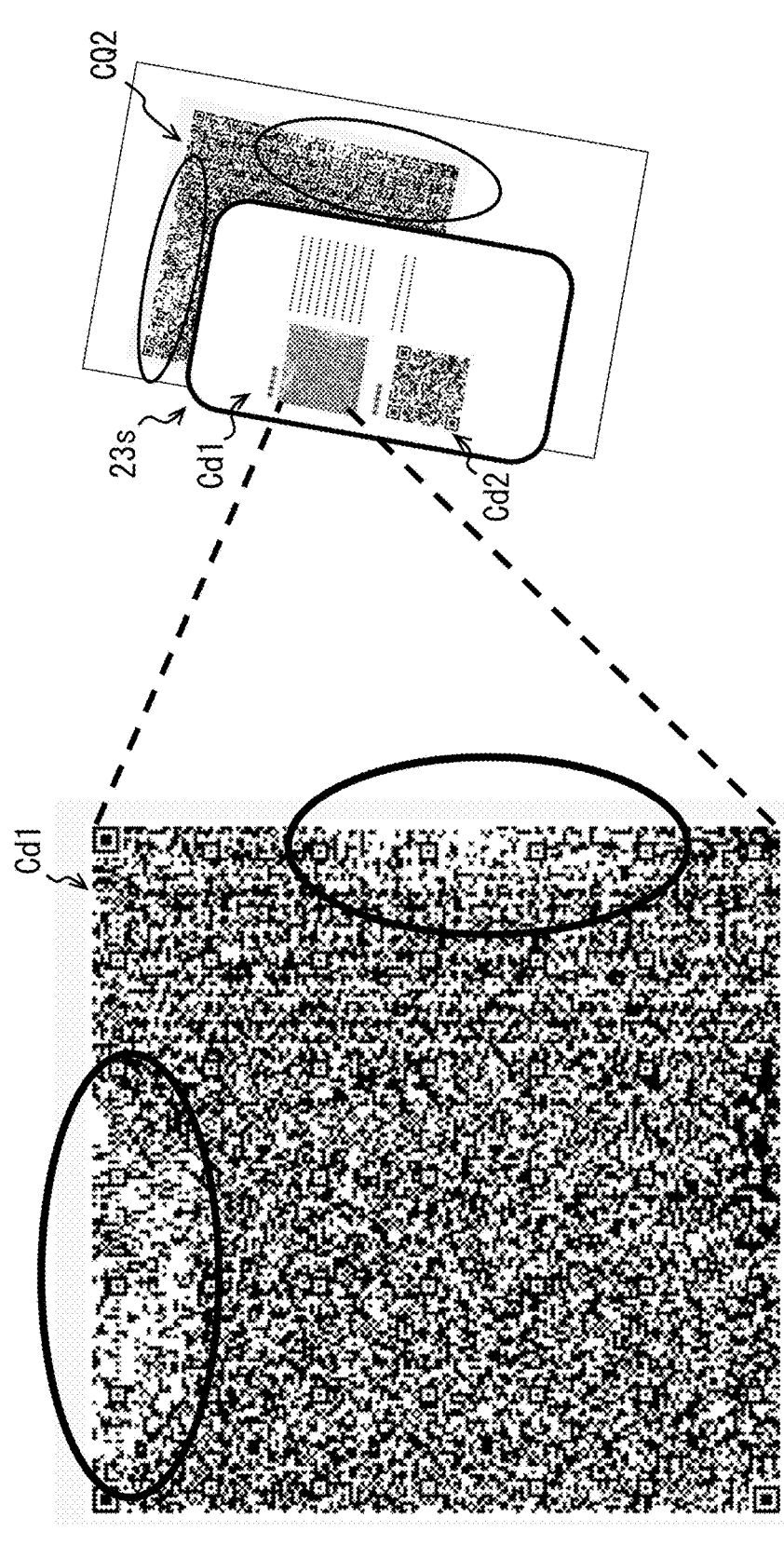
FIG. 10 shows an influence of light generated when reading the confidential code.

Specifically, as shown in FIG. 10, for example, when the information code CQ2 printed on a label or the like is read using the code reading application in the smartphone 23s, light enters toward the label from a periphery of the smartphone 23s, and thus an influence of light occurs in the vicinity of the outer edge of the information code CQ2. As a result, a phenomenon such as white-out occurs at a peripheral portion of the public code Cd1 read from the information code CQ2 (see elliptical ranges in FIG. 10). When the light affects the light color cell Cc1 in this manner, it is difficult to distinguish the light color cell Cc1 from the white cell Cew, and thus the light color cell Cc1 to be converted to the black cell Ceb is easily misidentified as the white cell Cew due to the influence of light. As a result, it is difficult to return the color cells Cc1 and Cc2 to the black cell Ceb and the white cell Cew. Even when the code scanner 23 is used, the same problem may occur.

However, in the present embodiment, the size of the confidential code Cd2 (enlarged code Cde) is set such that the public code Cd1 is larger, and the confidential code Cd2 is disposed at the center of the public code Cd1. Therefore, the light is less likely to affect the color cells Cc1 and Cc2. As a result, processing of returning the color cells Cc1 and Cc2 to the black cell Ceb and the white cell Cew can be reliably executed, and thus it is possible to reduce failures in reading the confidential code Cd2.

Further, when the version of the information code CQ2 increases, a distance between the code scanner 23 or the smartphone 23s and the information code CQ2 tends to increase in order to read the entire information code CQ2. Accordingly, it is easier for light to enter the outer edge portion of the information code CQ2. However, according to the above-described center arrangement of the confidential code Cd2, it is possible to limit the influence of light on the color cells Cc1 and Cc2. As described above, the center arrangement of the confidential code Cd2 in the public code Cd1 is more effective in reducing failures in code reading as the version of the public code Cd1 increases.

In addition, in the present embodiment, the confidential code Cd2 is combined with the public code Cd1 while avoiding the specific region SA in the public code Cd1. Specifically, the finder pattern FiP and the format information area FiA are treated as the specific region SA, and the light color cell Cc1 and the dark color cell Cc2 are not disposed in the finder pattern FiP and the format information area FiA. Accordingly, recognizability deterioration of the public code Cd1 is limited, and thus it is possible to reduce failures in reading the public code Cd1.

In the present embodiment, in the step of specifying the combining area CA, the first converted image Pc1 is generated in which the black cell Ceb in the information code CQ2 is converted into the same color as the white cell Cew. Further, the second converted image Pc2 is generated by converting the color cells Cc1 and Cc2 in the first converted image Pc1 into the same color as the black cell Ceb, and the inverted image Pc3 is generated by inverting lightness and darkness of the colors in the second converted image Pc2. Then, the combining area CA is specified based on a light-color range in the inverted image Pc3. As described above, according to the image processing in which black and white inversion is performed after the color cells Cc1 and Cc2 are blackened, it is possible to speed up processing of specifying formation ranges of the color cells Cc1 and Cc2. As a result, it is possible to quickly read the confidential information from the information code CQ2.

In the embodiment, the signal processor 41 corresponds to a "processor" that implements the code reading method, the public code Cd1 corresponds to a "first code", and the confidential code Cd2 corresponds to a "second code". The white cell Cew corresponds to a "light color cell", the black cell Ceb corresponds to a "dark color cell", the light color cell Cc1 or the light gray cell Cg1 corresponds to a "semi-light color cell", and the dark color cell Cc2 or the dark gray cell Cg2 corresponds to a "semi-dark color cell". Further, the combining area CA corresponds to a "formation range".

A technical idea that can be further grasped from the embodiment described so far will be described below as Appendices 1 to 6.

Appendix 1

A code generation method to be executed by at least one processor and causing the at least one processor to perform:
preparing a first code and a second code in each of which information is recorded by multiple cells arranged in a two-dimensional array; and
generating an information code by combining the first code with the second code,
wherein the combining of the first code with the second code includes
enlarging the second code relative to the first code to combine one cell of the second code across two or more cells of the first code,
setting a light color cell at a position where the first code and the second code both have light color cells,
setting a dark color cell at a position where the first code and the second code both have dark color cells,
setting a semi-light color cell at a position where the first code has the light color cell and the second code has the dark color cell, the semi-light color cell having a color closer to the light color cell than to the dark color cell, and
setting a semi-dark color cell at a position where the first code has the dark color cell and the second code has the light color cell, the semi-dark color cell having a color closer to the dark color cell than to the light color cell.

Appendix 2

A code generation method to be executed by at least one processor and causing the at least one processor to perform:
preparing a first code and a second code, in each of which information is recorded by multiple cells arrange in a two-dimensional array, and
generating an information code by combining the first code with the second code,
wherein the combining of the first code with the second code includes
combining the second code having a smaller size than the first code at a center of the first code,
setting a light color cell at a position where the first code and the second code both have light color cells,
setting a dark color cell at a position where the first code and the second code both have dark color cells,
setting a semi-light color cell at a position where the first code has the light color cell and the second code has the dark color cell, the semi-light color cell having color closer to the light color cell than to the dark color cell, and
setting a semi-dark color cell at a position where the first code has the dark color cell and the second code has the light color cell, the semi-dark color cell having a color closer to the dark color cell than to the light color cell.

Appendix 3

A code generation apparatus that generates an information code by combining a first code with a second code, in each the first code and the second code, information being recorded by multiple cells arranged in a two-dimensional array, the code generation apparatus comprising:
a code preparation unit configured to prepare the first code and the second code; and
a code combining unit configured to generate the information code by combining the first code with the second code,
wherein the code combining unit
enlarges the second code relative to the first code to combine one of the multiple cells in the second code across two or more of the multiple cells in the first code,
sets a light color cell at a position where the first code and the second code both have light color cells,
sets a dark color cell at a position where the first code and the second code both have dark color cells,
sets a semi-light color cell at a position where the first code has the light color cell and the second code has the dark color cell, the semi-light color cell having a color closer to the light color cell than to the dark color cell, and
sets a semi-dark color cell at a position where the first code has the dark color cell and the second code has the light color cell, the semi-dark color cell having a color closer to the dark color cell than to the light color cell.

Appendix 4

A code generation apparatus that generates an information code by combining a first code with a second code, in each of the first code and the second code, information being recorded by multiple cells arranged in a two-dimensional array, the code generation apparatus comprising:
a code preparation unit configured to prepare the first code and the second code; and
a code combining unit configured to generate the information code by combining the first code with the second code,
wherein the code combining unit
combines the second code having a smaller size than the first code at a center of the first code,
sets a light color cell at a position where the first code and the second code both have light color cells,
sets a dark color cell at a position where the first code and the second code both have dark color cells,
sets a semi-light color cell at a position where the first code has the light color cell and the second code has the dark color cell, the semi-light color cell having a color closer to the light color cell than to the dark color cell, and
sets a semi-dark color cell at a position where the first code has the dark color cell and the second code has the light color cell, the semi-dark color cell having a color closer to the dark color cell than to the light color cell.

Appendix 5

A code reading apparatus that reads a second code from an information code, the information code being generated by combining a first code and the second code, in each of the first code and the second code, information being recorded by multiple cells arranged in a two-dimensional array, the code reading apparatus comprising:

an image acquisition unit configured to acquire a code image in which the information code is captured; and an image conversion unit configured to determine a semi-light color cell, which has a color closer to a light color cell than to a dark color cell, as the dark color cell in the information code, and determine a semi-dark color cell, which has a color closer to the dark color cell than to the light color cell, as the light color cell in the information code, wherein the image conversion unit reads the second code by identifying two or more of the multiple cells in the first code as one cell.

Appendix 6

A code reading apparatus that reads a second code from an information code, the information code being generated by combining a first code and the second code, in each of the first code and the second code, information being recorded by multiple cells arranged in a two-dimensional array, the code reading apparatus comprising:

an image acquisition unit configured to acquire a code image in which the information code is captured; and an image conversion unit configured to specify a formation range of the second code, which is combined at a center of the first code, determine a semi-light color cell, which has a color closer to a light color cell than to a dark color cell, as the dark color cell in the formation range, and determine a semi-dark color cell, which has a color closer to the dark color cell than to the light color cell, as the light color cell in the formation range.

In the embodiment, the history management server 20 corresponds to the "code generation apparatus", and the history management server 20 or the code scanner 23 corresponds to the "code reading apparatus".

Other Embodiments

Although one embodiment according to the present disclosure has been described above, the present disclosure is not construed as being limited to the embodiment and can be applied to various embodiments and combinations within a scope not departing from the spirit of the present disclosure.

In a first modification of the embodiment, an entire area of the information code CQ2 may be used as the combining area CA. In other words, in the first modification, the specific region SA where combination is avoided is not set. As a result, it is possible to set a larger enlargement ratio than that in the embodiment for the confidential code Cd2. As an example, the enlarged code Cde enlarged to twice the size of the confidential code Cd2 whose version is 4 can be combined with the public code Cd1 whose version is 13 (see a dashed square in FIG. 11). As a result, in the first modification, it is possible to further improve recognizability of the confidential code Cd2.

Figure 12:
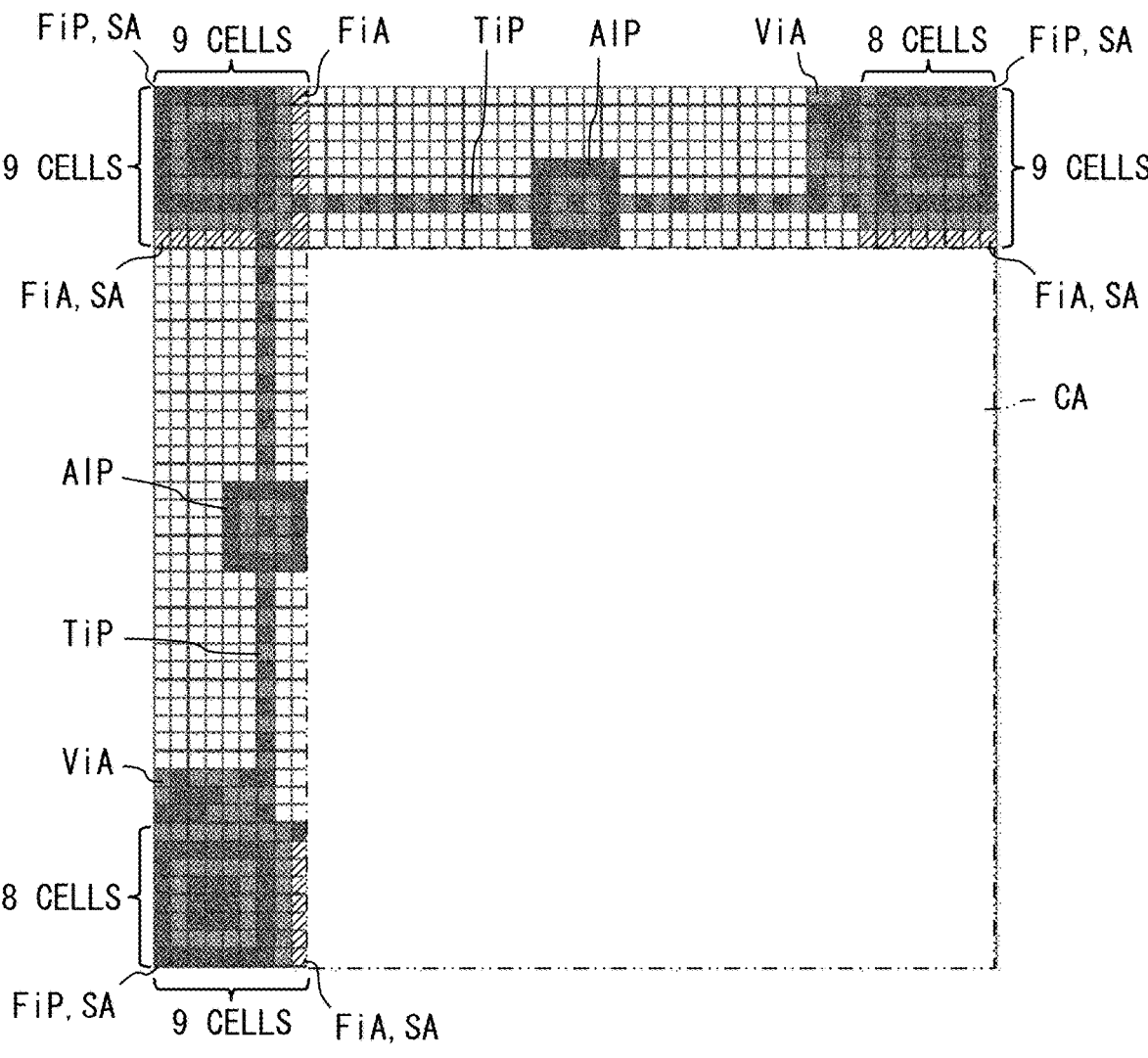
FIG. 12 shows details of a combining area set in an information code in a second modification.

In a second modification of the above-described embodiment, as shown in FIG. 12, the combining area CA is offset and disposed at one of the four corners of the information code CQ2 where the finder pattern FiP is absent. In the second modification, an area of the combining area CA can be larger than that in the embodiment in which the combining area CA is set at the center of the information code CQ2. The number of cells in the combining area CA is smaller than the number of cells in the public code Cd1 by 9 cells and 8 cells in vertical and horizontal directions, respectively. For example, when the version of the public code Cd1 is 15 (the number of cells is 77×77), the size of the combining area CA is 68×69. In this case, it is possible to combine the enlarged code Cde enlarged to twice the size of the confidential code Cd2 (the number of cells is 33×33) whose version is 4(see a dashed square in FIG. 13).

According to the first and second modifications, it is possible to obtain the same effect as that in the embodiment and to reduce code reading failures by enlarging the confidential code Cd2.

In a third modification of the embodiment, the processing of enlarging the confidential code Cd2 is omitted. The confidential code Cd2 is combined with the combining area CA at the center of the public code Cd1 in a manner of avoiding the specific region SA. In the third modification described above, since the light color cell Cc1 and the dark color cell Cc2 are still not disposed in the vicinity of the outer edge of the information code CQ2, it is possible to avoid a decrease in recognizability due to the influence of light.

In a fourth modification of the embodiment, the method of specifying the combining area CA in the code reading processing is different from that in the embodiment. The signal processor 41 in the fourth modification starts searching for the light color cell Cc1 and the dark color cell Cc2 from a pair of corners (for example, an upper left corner and a lower right corner) diagonally located in the information code CQ2. The signal processor 41 cuts out the cutout image Pc4 by setting positions where the light color cell Cc1 and the dark color cell Cc2 are detected as the coordinates indicating the formation range of the combining area CA. With such a method, it is still possible to determine the coordinates of the pair of corners.

In a fifth modification of the embodiment, an enlargement ratio that is not an integer (for example, 1.5 times) is set. As long as reading of the public code Cd1 by the code reader 13 used in the distribution management system 110 is not hindered, a boundary of the cell Ce in the confidential code Cd2 may be located in one cell Ce in the public code Cd1. In the embodiment, the confidential code Cd2 is combined in such a manner that the boundary of the cell Ce in the confidential code Cd2 (enlarged code Cde) overlaps the boundary of the cell Ce in the public code Cd1. However, as long as code reading is available, the boundary of the cell Ce in the confidential code Cd2 may be misaligned with the boundary of the cell Ce in the public code Cd1.

In the embodiment, a light color forming the white cell Cew may not be strictly white. For example, a color of a base material such as a label where the information code CQ2 is printed (for example, fairly light gray or ivory) may correspond to the light color. Similarly, a dark color forming the black cell Ceb may not be strictly black. For example, a color of ink used in the label printer 12 (for example, dark blue or dark green) may correspond to the dark color.

The public code Cd1 and the confidential code Cd2 are not limited to QR codes. Two-dimensional codes other than the QR codes may be used as the first code and the second code and combined into the information code. Further, when QR codes are used as the codes, an error correction capability (error correction level) may differ.

The information code CQ2 according to the present disclosure may be used by a system different from the distribution management system 110 and the traceability system 120. Further, information recorded in the first code and the second code that are sources of the information code is not limited to the public information and the confidential information, and may be appropriately changed according to use of the information code.

In the embodiment, in addition to the information code CQ2 used in the supply chain SC, the trace code QRt is issued and attached to the final product FP. However, the information code CQ2 may be used as the trace code QRt. In this case, the traceability check application executes the code reading processing and provides the user terminal 50 with a function for reading the confidential code Cd2. The final product FP supplied by the supply chain SC may be appropriately changed. For example, the traceability system 120 may manage various articles such as an automobile, a battery, a semiconductor, fresh food, an aquatic product, food, flowers, a pharmaceutical, or a chemical.

The hash function used in the history management server 20 is a cryptographic hash function and has a characteristic that the same hash value is not output from different inputs and it is substantially impossible to estimate an input from the output hash value. For example, instead of SHA-256, an encryption algorithm such as SHA-1, SHA-2, or SHA-3 may be appropriately used according to an output length (the number of bits) recordable in the confidential code Cd2 as the confidential information. The code generation processing executed by the history management server 20 may be executed by the code output machine 22 or the like on an edge side. In this aspect, the code output machine 22 corresponds to the "code generation apparatus".

In the embodiment, functions provided by the history management server, the code scanner, and the like may be provided by software and hardware for executing the software, only software, only hardware, or a composite combination thereof. When such functions are provided by an electronic circuit as the hardware, each function may be provided by a digital circuit including a large number of logic circuits or an analog circuit.

The processor (signal processor) in the embodiment may include at least one computational core such as a central processing unit (CPU) and a graphics processing unit (GPU). The processor may further include a field-programmable gate array (FPGA), a neural network processing unit (NPU), and an IP core having another dedicated function.

A form of a non-transitory tangible storage medium that is adopted as each storage unit in the embodiment and stores each program related to code generation and code reading in the present disclosure may be appropriately changed. For example, the storage medium is not limited to a configuration provided on a circuit board, and may be provided in a form of a memory card, inserted into a slot portion, and electrically connected to a bus of a computer. Further, the storage medium may be an optical disc, a hard disc drive, or the like serving as a basis for copying a program to a computer.

The control unit and the method thereof described in the present disclosure may be implemented by a dedicated computer constituting a processor programmed to execute one or multiple functions embodied by a computer program. Alternatively, the apparatus and the method thereof according to the present disclosure may be implemented by a dedicated hardware logic circuit. Alternatively, the apparatus and the method thereof according to the present disclosure may be implemented by one or more dedicated computers implemented by a combination of a processor that executes a computer program and one or more hardware logic circuits. The computer program may be stored in a computer-readable non-transient tangible recording medium as an instruction executed by a computer.

What is claimed is:

1. A display medium comprising an information code, wherein the information code is displayed on the display medium, the information code is generated by combining a first code and a second code, in each of the first code and the second code, information is recorded by multiple cells arranged in a two-dimensional array, the information code includes:

a light color cell;

a dark color cell;

a semi-light color cell having a color closer to the light color cell than to the dark color cell, the semi-light color cell being identified as the same as the light color cell in a reading of the first code and being identified as the dark color cell in a reading of the second code; and a semi-dark color cell having a color closer to the dark color cell than to the light color cell, the semi-dark color cell being identified as the same as the dark color cell in the reading of the first code and being identified as the light color cell in the reading of the second code, and the second code is enlarged relative to the first code, and one of the multiple cells in the second code is combined across two or more of the multiple cells in the first code.

2. The display medium according to claim 1, wherein the second code is enlarged by an integral multiple relative to the first code and then combined with the first code.

3. The display medium according to claim 1, wherein the second code has a smaller size than the first code and is combined at a center of the first code.

4. A display medium comprising an information code, wherein the information code is displayed on the display medium, the information code is generated by combining a first code and a second code, in each of the first code and the second code, information is recorded by multiple cells arranged in a two-dimensional array, the information code includes:

a light color cell;

a dark color cell;

a semi-light color cell having a color closer to the light color cell than to the dark color cell, the semi-light color cell being identified as the same as the light color cell in a reading of the first code and being identified as the dark color cell in a reading of the second code; and a semi-dark color cell having a color closer to the dark color cell than to the light color cell, the semi-dark color cell being identified as the same as the dark color cell in the reading of the first code and being identified as the light color cell in the reading of the second code, and the second code has a smaller size than the first code and is combined at a center of the first code.

5. The display medium according to claim 1, wherein the second code is combined with the first code by avoiding a specific region of the first code.

6. A code reading method to be executed by at least one processor, the code reading method reading a second code from an information code, the information code being generated by combining a first code with the second code, in each of the first code and the second code, information being recorded by multiple cells arranged in a two-dimensional array, the code reading method comprising:

determining a semi-light color cell, which has a color closer to a light color cell than to a dark color cell, as the dark color cell;

determining a semi-dark color cell, which has a color closer to the dark color cell than to the light color cell, as the light color cell; and reading the second code by identifying two or more cells in the first code as one cell.

7. A code reading method to be executed by at least one processor, the code reading method reading a second code from an information code, the information code being generated by combining a first code with the second code, in each of the first code and the second code, information being recorded by multiple cells arranged in a two-dimensional array, the code reading method comprising:

specifying a formation range of the second code, which is combined at a center of the first code;

determining a semi-light color cell, which has a color closer to a light color cell than to a dark color cell among the cells in the formation range, as the dark color cell; and determining a semi-dark color cell, which has a color closer to the dark color cell than to the light color cell among the cells in the formation range, as the light color cell.

8. The code reading method according to claim 7, wherein the specifying of the formation range includes generating a first converted image by converting the dark color cell in the information code into a same color as the light color cell, generating a second converted image by converting the semi-light color cell and the semi-dark color cell in the first converted image into a same color as the dark color cell, generating an inverted image by inverting lightness and darkness of color in the second converted image, and specifying the formation range based on a light color range in the inverted image.

* * * * *